UNITED STATES PATENT OFFICE.

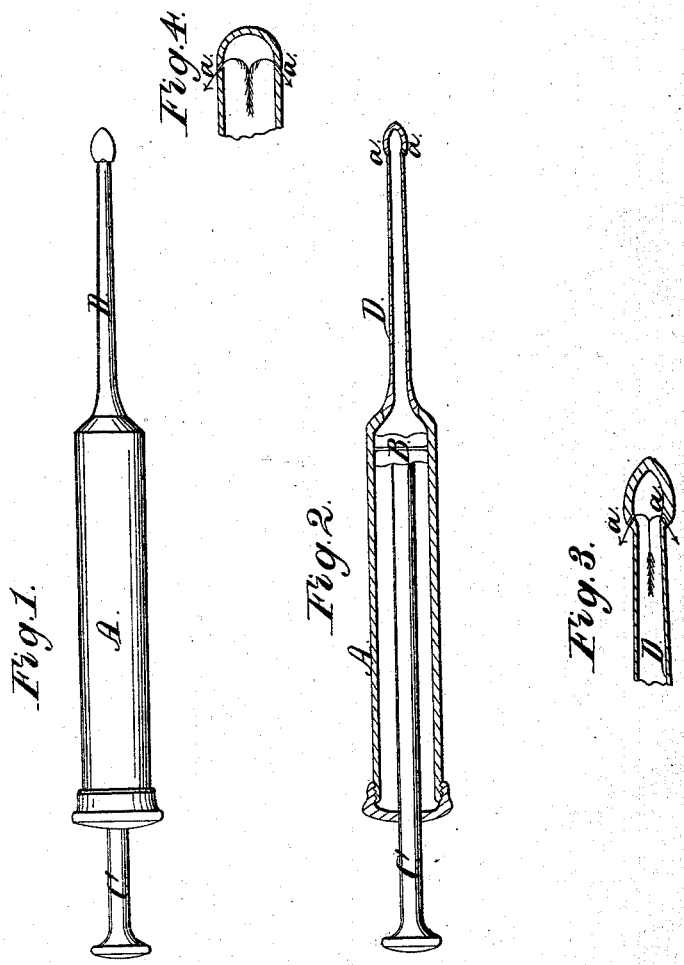

LUKE WHEELOCK, OF NEW HAVEN, CONNECTICUT, ASSIGNOR TO HIMSELF AND O. B. LEAVENWORTH, OF SAME PLACE.

IMPROVEMENT IN SYRINGES.

Specification forming part of Letters Patent No. 47,248, dated April 11, 1865.

*To all whom it may concern:*

Be it known that I, LUKE WHEELOCK, of New Haven, in the county of New Haven and State of Connecticut, have invented a new and useful Improvement in Syringes; and I do hereby declare the following to be a full, clear, end exact description of the same, when taken in connection with the accompanying drawings and the letters of reference marked thereon, and which said drawings constitute part of this specification and represent, in—

Figure 1, a side view; Fig. 2, a longitudinal central section; Fig. 3, the discharge-pipe enlarged, and in Fig. 4 the discharge end of a female-syringe.

My improvement relates more particularly to "venereal syringes;" but the same principle may be applied in the construction of other syringes.

My invention consists in forming the discharge-apertures inclined outward instead of inward, as in common syringes.

To enable others skilled in the art to construct and use my invention, I will proceed to fully describe the same as illustrated in the accompanying drawings.

A is the shell or case of the syringe; B, the piston; C, the piston-rod; D, the tube, all constructed in the usual manner from metal, glass, or other suitable material, with the exception of the discharge end of the tube D, which is shown enlarged in Fig. 3, instead of being a single aperture, as in ordinary male-syringes. I make several, as seen at *a a*, Fig. 3, inclined so as to discharge back, as denoted by arrows, the object of this being to discharge the contents of the syringe back onto the disease without throwing it beyond, to the injury of the patient. This object cannot be attained in the common syringe; neither can the disease be reached with that certainty which my invention insures.

Fig. 4 represents the discharge end of a female-syringe, with apertures formed in like manner and for similar objects.

Syringes for other purposes may be constructed in like manner. Therefore, without confining myself to syringes for any particular purpose, I do not claim enlarging or forming a globular-shaped end to the tube of syringes; neither do I claim piercing the enlarged end of syringes with numerous small holes, as in the patent of Ira Warren, December 6, 1853, in which none of the holes open toward the syringe.

What I claim as new and useful, and desire to secure by Letters Patent, is—

A syringe when the discharge-apertures are formed substantially as and for the purpose specified.

LUKE WHEELOCK.

Witnesses:
JOHN E. EARLE,
RUFUS SANFORD.